(12) United States Patent
Nakajo et al.

(10) Patent No.: US 9,928,664 B2
(45) Date of Patent: Mar. 27, 2018

(54) IMAGE PROCESSING DEVICE, IMAGE PROCESSING METHOD AND NON-TRANSITORY COMPUTER-READABLE RECORDING MEDIUM

(71) Applicant: LIVE2D INC., Tokyo (JP)

(72) Inventors: Tetsuya Nakajo, Tokyo (JP); Masayuki Todate, Tokyo (JP)

(73) Assignee: LIVE2D INC., Tokyo (JP)

( * ) Notice: Subject to any disclaimer, the term of this patent is extended or adjusted under 35 U.S.C. 154(b) by 73 days.

(21) Appl. No.: 15/039,705

(22) PCT Filed: Oct. 23, 2014

(86) PCT No.: PCT/JP2014/078245
§ 371 (c)(1),
(2) Date: May 26, 2016

(87) PCT Pub. No.: WO2015/083455
PCT Pub. Date: Jun. 11, 2015

(65) Prior Publication Data
US 2016/0379420 A1    Dec. 29, 2016

(30) Foreign Application Priority Data

Dec. 2, 2013  (JP) .................................. 2013-249602

(51) Int. Cl.
*G06T 19/20*    (2011.01)
*G06T 13/40*    (2011.01)
(Continued)

(52) U.S. Cl.
CPC ................ *G06T 19/20* (2013.01); *G06T 1/60* (2013.01); *G06T 13/20* (2013.01); *G06T 13/40* (2013.01); *G06T 2219/2004* (2013.01)

(58) Field of Classification Search
CPC ............... G06F 17/50; G06F 17/30958; G06F 17/5068; G06T 11/60; G06T 13/40;
(Continued)

(56) References Cited

U.S. PATENT DOCUMENTS

2008/0084429 A1    4/2008  Wissinger
2010/0024318 A1*   2/2010  Zhang .................... E04B 7/022
                                                 52/79.5
(Continued)

FOREIGN PATENT DOCUMENTS

CA    2774114 A1    4/2011
JP    H01217681 A   8/1989
(Continued)

OTHER PUBLICATIONS

Office Action issued by Korean Patent Office dated Jan. 6, 2017, in connection with related Korean application No. 10-2016-7015627.
(Continued)

*Primary Examiner* — Haixia Du
(74) *Attorney, Agent, or Firm* — Enshan Hong; VLP Law Group LLP

(57) ABSTRACT

An acquirer (231) of an image processing device (100) acquires first connection information set between a first part displayed on a display (30) and glue from a glue setting table (214) of a memory (210). The acquirer (231) acquires second connection information set between a second part displayed on the display (30) and the glue from glue setting table (214) of the memory (210). A controller (232) connects together the first part and the second part displayed on the display (30) based on the first connection information and the second connection information acquired by the acquirer (231). A display controller (230) displays the first part and the second part connected together on the display (30).

11 Claims, 14 Drawing Sheets

(51) Int. Cl.
*G06T 1/60* (2006.01)
*G06T 13/20* (2011.01)

(58) Field of Classification Search
CPC . G06T 19/00; G06T 19/20; G06T 2219/2004; G06T 2219/2016; G06T 7/60; G06T 11/206; G06T 17/10; G06T 2219/2021; B29C 33/3835; H01R 12/52; Y10S 715/964
See application file for complete search history.

(56) References Cited

U.S. PATENT DOCUMENTS

| | | | |
|---|---|---|---|
| 2015/0002545 A1 | 1/2015 | Webster et al. | |
| 2015/0056042 A1* | 2/2015 | Marxkors | F16B 5/04 411/501 |

FOREIGN PATENT DOCUMENTS

| | | |
|---|---|---|
| JP | H06178777 A | 6/1994 |
| JP | H0994348 A | 4/1997 |
| JP | H09190459 A | 7/1997 |
| JP | H1074270 A | 3/1998 |
| JP | 2001209824 A | 8/2001 |
| JP | 2001245320 A | 9/2001 |
| JP | 2001356756 A | 12/2001 |
| JP | 2003085591 A | 3/2003 |
| JP | 2005-122479 A | 5/2005 |
| JP | 2008235989 A | 10/2008 |
| JP | 2009104570 A | 5/2009 |
| JP | 5610327 B | 10/2014 |

OTHER PUBLICATIONS

Shinya, Permeanent file!, 64 pages for thorough master of new Shade, All mankind Shade R5 plan, Learn from 12 people!, R5 ultimate technique, Make a cool woman using "Skin"! WinGraphic No. 27, Japan, MdN Corporation, Aug. 1, 2001, No. 27, pp. 51-55.
Notice of Reasons for Rejection dated Feb. 4, 2014 by the Japanese Patent Office for the Japan Counterpart Application No. 2013-249602.
Office Action dated Mar. 20, 2017 for related Canadian Application No. 2932157 by Canadian Intellectual Property Office.
Office Action dated Jul. 19, 2017 for related Canadian Application No. 2943108 by Canadian Intellectual Property Office.
Non-final Office Action issued by the USPTO dated Feb. 8, 2018 for related U.S. Appl. No. 15/123,551.

* cited by examiner

PARTS TABLE

| PART ID | PART NAME | PARAMETER |
|---|---|---|
| A | UPPER ARM | $\theta x$ |
|   |           | $\theta y$ |
|   |           | CLOTHING |
| B | LOWER ARM | $\theta x$ |
|   |           | $\theta y$ |
|   |           | CLOTHING |
| C | FACE | FACE COLOR |
| D | EYE | EYE GAZE DIRECTION |
|   |     | OPEN AND CLOSING |
| ⋮ | ⋮ | ⋮ |
| ⋮ | ⋮ | ⋮ |

FIG.5A

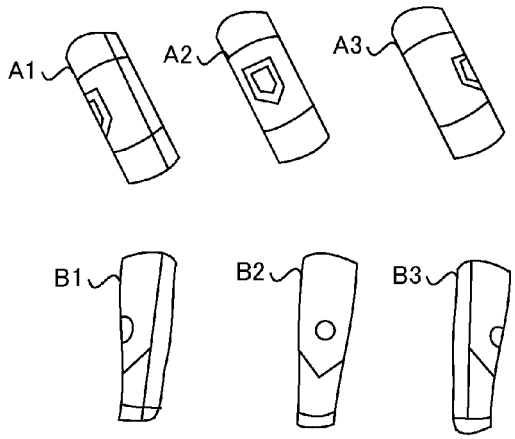

FIG.5B

UPPER ARM PART DISPLAY FORM TABLE

| PART ID | PARAMETER | PARAMETER VALUE | DISPLAY FORM ID | OBJECT |
|---|---|---|---|---|
| A | $\theta x$ | −90 | A1 | LINE DRAWING A1 |
| | $\theta y$ | 0 | | IMAGE A1 |
| | CLOTHING | 1 | | : |
| | $\theta x$ | 0 | A2 | LINE DRAWING A2 |
| | $\theta y$ | 0 | | IMAGE A2 |
| | CLOTHING | 1 | | : |
| | $\theta x$ | 90 | A3 | LINE DRAWING A3 |
| | $\theta y$ | 0 | | IMAGE A3 |
| | CLOTHING | 1 | | : |

LOWER ARM PART DISPLAY FORM TABLE

| PART ID | PARAMETER | PARAMETER VALUE | DIPLAY FORM ID | OBJECT |
|---|---|---|---|---|
| B | $\theta x$ | −90 | B1 | LINE DRAWING B1 |
| | $\theta y$ | 0 | | IMAGE B1 |
| | CLOTHING | 2 | | : |
| | $\theta x$ | 0 | B2 | LINE DRAWING B2 |
| | $\theta y$ | 0 | | IMAGE B2 |
| | CLOTHING | 2 | | : |
| | $\theta x$ | 90 | B3 | LINE DRAWING B3 |
| | $\theta y$ | 0 | | IMAGE B3 |
| | CLOTHING | 2 | | : |

FIG.7A

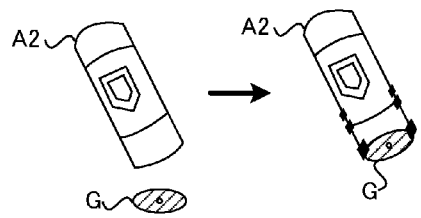

FIG.7B

UPPER ARM PART A2 GLUE SETTING TABLE

| DISPLAY FORM ID | GLUE ID | CONNECTION INFORMATION | |
|---|---|---|---|
| A2 | G | POSITIONAL INFLUENCE LEVEL ON G | 50% |
| | | CONNECTION MODE WITH G | EXTEND |
| | | WEIGHTED POSITION AND MAGNITUDE | DIAMOND SHAPE |
| | | COLOR BLENDING PERCENTAGE | 0 |
| | | COLOR BLENDING AREA | 0 |

FIG.8A

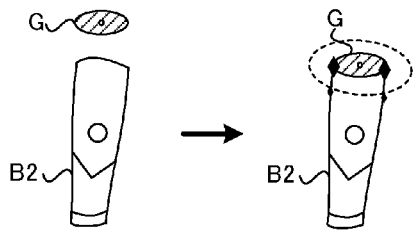

FIG.8B

LOWER ARM PART B2 GLUE SETTING TABLE

| DISPLAY FORM ID | GLUE ID | CONNECTION INFORMATION | |
|---|---|---|---|
| B2 | G | POSITIONAL INFLUENCE LEVEL ON G | 50% |
| | | CONNECTION MODE WITH G | MOVE |
| | | WEIGHTED POSITION AND MAGNITUDE | DIAMOND SHAPE |
| | | COLOR BLENDING PERCENTAGE | 50% |
| | | COLOR BLENDING AREA | ELLIPSE (BROKEN LINE) |

FIG.15A

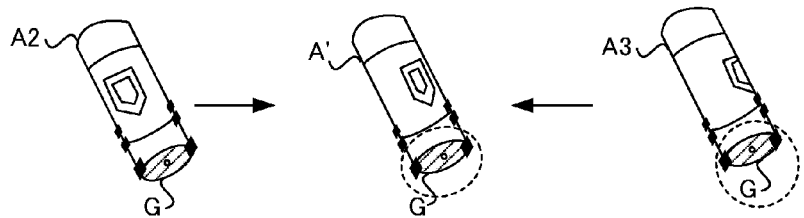

FIG.15B

UPPER ARM PART A' INTERPOLATION TABLE

| PART ID | PARAMETER | VALUE | DISPLAY FORM ID | GLUE ID | CONNECTION INFORMATION | |
|---|---|---|---|---|---|---|
| A | θx | 0 | A2 | G | POSITIONAL INFLUENCE LEVEL ON G | 50% |
| | | | | | CONNECTION MODE WITH G | EXTEND |
| | θy | 0 | | | WEIGHTED POSITION AND MAGNITUDE | DIAMOND SHAPE |
| | | | | | COLOR BLENDING PERCENTAGE | 0 |
| | CLOTHING | 1 | | | COLOR BLENDING AREA | 0 |
| | θx | 45 | A' | G | POSITIONAL INFLUENCE LEVEL ON G | 65% |
| | | | | | CONNECTION MODE WITH G | EXTEND |
| | θy | 0 | | | WEIGHTED POSITION AND MAGNITUDE | DIAMOND SHAPE |
| | | | | | COLOR BLENDING PERCENTAGE | 40% |
| | CLOTHING | 1 | | | COLOR BLENDING AREA | ELLIPSE (BROKEN LINE) |
| | θx | 90 | A3 | G | POSITIONAL INFLUENCE LEVEL ON G | 80% |
| | | | | | CONNECTION MODE WITH G | EXTEND |
| | θy | 0 | | | WEIGHTED POSITION AND MAGNITUDE | DIAMOND SHAPE |
| | | | | | COLOR BLENDING PERCENTAGE | 80% |
| | CLOTHING | 1 | | | COLOR BLENDING AREA | ELLIPSE (BROKEN LINE) |

FIG.16A

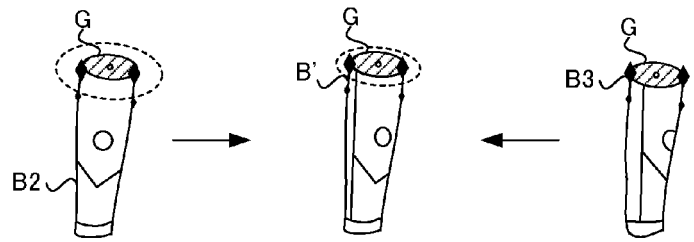

FIG.16B

LOWER ARM PART B' INTERPOLATION TABLE

| PART ID | PARAMETER | VALUE | DISPLAY FORM ID | GLUE ID | CONNECTION INFORMATION | |
|---|---|---|---|---|---|---|
| B | θx | 0 | B2 | G | POSITIONAL INFLUENCE LEVEL ON G | 50% |
| | | | | | CONNECTION MODE WITH G | MOVE |
| | θy | 0 | | | WEIGHTED POSITION AND MAGNITUDE | DIAMOND SHAPE |
| | | | | | COLOR BLENDING PERCENTAGE | 50% |
| | CLOTHING | 2 | | | COLOR BLENDING AREA | ELLIPSE (BROKEN LINE) |
| | θx | 45 | B' | G | POSITIONAL INFLUENCE LEVEL ON G | 35% |
| | | | | | CONNECTION MODE WITH G | MOVE |
| | θy | 0 | | | WEIGHTED POSITION AND MAGNITUDE | DIAMOND SHAPE |
| | | | | | COLOR BLENDING PERCENTAGE | 25% |
| | CLOTHING | 2 | | | COLOR BLENDING AREA | ELLIPSE (BROKEN LINE) |
| | θx | 90 | B3 | G | POSITIONAL INFLUENCE LEVEL ON G | 20% |
| | | | | | CONNECTION MODE WITH G | MOVE |
| | θy | 0 | | | WEIGHTED POSITION AND MAGNITUDE | DIAMOND SHAPE |
| | | | | | COLOR BLENDING PERCENTAGE | 0% |
| | CLOTHING | 2 | | | COLOR BLENDING AREA | 0 |

IMAGE PROCESSING DEVICE, IMAGE PROCESSING METHOD AND NON-TRANSITORY COMPUTER-READABLE RECORDING MEDIUM

PRIORITY CLAIM

This is a U.S. national stage of application No. PCT/JP2014/078245, filed on Oct. 23, 2014. Priority is claimed on the following applications: Country: Japan, Application No.: 2013-249602, Filed: Dec. 2, 2013, the content of which is incorporated here by reference.

TECHNICAL FIELD

The present disclosure relates to an image processing device, an image processing method, and a program.

BACKGROUND ART

Image processing techniques for changing a state (for example, changing facial expressions and body movements) of a two-dimensional model are well known.

For example, Patent Literature 1 discloses an image processing technique for changing an expression by changing each part that makes up a two-dimensional model based on parameters that cause an appearance to be changed. For example, Patent Literature 1 discloses an image processing technique for opening and closing an eye based on an eye opening/closing parameter when an eye is a part.

CITATION LIST

Patent Literature

Patent Literature 1: Unexamined Japanese Patent Application Kokai Publication No. 2009-104570

SUMMARY OF INVENTION

Technical Problem

Regarding each of the parts that make up a two-dimensional model, changing the appearance of a single part (for example, the opening/closing operation of a standalone part such as an eye as described in the above-mentioned Patent Literature 1) is generally relatively easy. However, it is difficult to display a joint, which combines parts together, in a way that looks natural.

Particularly, when there are multiple display forms of parts to be combined together (for example, when there are multiple display forms of an upper arm part and multiple display forms of a lower arm part), the user, in many cases, must perform editing work for every combination of the display forms of each of the parts. Thus, the editing workload of the user increases as the number of display forms of parts increases. Moreover, the storage capacity required also increases.

On the contrary, in the case of a three-dimensional model, polygon mesh of the skin is attached to the bones of a skeleton. In such a three-dimensional model, the shape of the polygon mesh changes according to the movement of the bone. Thus, the concept of connecting together separated parts as in a two-dimensional model does not exist.

In consideration of the above circumstances, in the case of two dimensions, image processing techniques that enable for parts to be connected together in a way that looks natural while minimizing user workload and storage capacity are desired.

The present disclosure is made to solve the problems described above, and an objective of the present disclosure is to provide, in the case of two dimensions, an image processing device, an image processing method, and a program that enable for parts to be connected together naturally while minimizing user workload and storage capacity.

Solution to Problem

To achieve the above-mentioned objective, the image processing device includes:

first memory means for storing, for each of a plurality of different display forms, first connection information regarding connection set between a display form of a first part and a connection medium that mediates connection of two-dimensional parts that are separated;

second memory means for storing, for each of a plurality of different display forms, second connection information regarding connection set between a display form of a second part and the connection medium;

first acquisition means for acquiring the first connection information set between the display form of the first part displayed on a display means and the connection medium, from the first memory means;

second acquisition means for acquiring the second connection information set between the display form of the second part displayed on the display means and the connection medium, from the second memory means; and connection means for connecting together the first part and the second part displayed on the display means based on the first connection information acquired by the first acquisition means and the second connection information acquired by the second acquisition means.

Advantageous Effects of Invention

According to the present disclosure, in the case of two dimensions, parts are connectable together in a way that looks natural while minimizing user workload and storage capacity.

BRIEF DESCRIPTION OF DRAWINGS

FIG. 5A is a diagram illustrating an example of each display form of a part;

FIG. 5B is a flowchart illustrating an example of a display form table;

FIG. 7A is a diagram illustrating the relationship between a glue G and an upper arm part A2;

FIG. 7B is a diagram illustrating an example of an upper arm part A2 glue setting table;

FIG. 8A is a diagram illustrating the relationship between the glue G and a lower arm part B2;

FIG. 8B is a diagram illustrating an example of a lower arm part B2 glue setting table;

FIG. 15A is a diagram illustrating states in which an upper arm part A' is being interpolated;

FIG. 15B is a diagram illustrating an example of an upper arm part A' interpolation table;

FIG. 16A is a diagram illustrating states in which a lower arm part B' is being interpolated;

FIG. 16B is a diagram illustrating an example of a lower arm part B' interpolation table.

DESCRIPTION OF EMBODIMENTS

Figure 1:
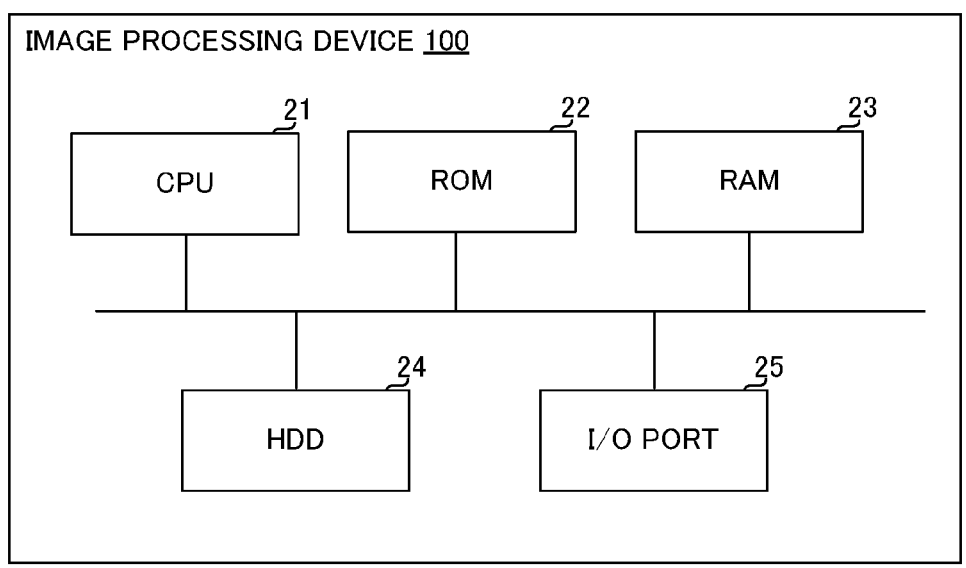
FIG. 1 is a block diagram illustrating a hardware configuration of an image processing device according to an embodiment of the present disclosure.

Hereinafter, the image processing device in the embodiment of the present disclosure is described with reference to FIG. 1. An image processing device 100 as illustrated in FIG. 1 includes a CPU 21, a ROM 22, a RAM 23, a HDD 24, and an I/O port 25. Among these, the CPU 21 is a central processing device for controlling the whole of the image processing device 100. The ROM 22 is non-volatile memory that stores programs that are executed by the CPU 21.

The RAM 23 is volatile memory that temporarily holds the programs that are executed by the CPU 21, and is used as a work area when the CPU 21 executes various kinds of processing.

The hard disk drive (HDD) 24 is large-capacity, non-volatile memory for storing various data regarding parts. For example, the HDD 24 stores data and the like for each part of a two-dimensional model and each type of table which are described further below. The I/O port 25 is an interface for connecting an inputter 10 such as a keyboard and/or a mouse (Refer to FIG. 2.) and/or a display 30 such as a monitor display.

Figure 2:
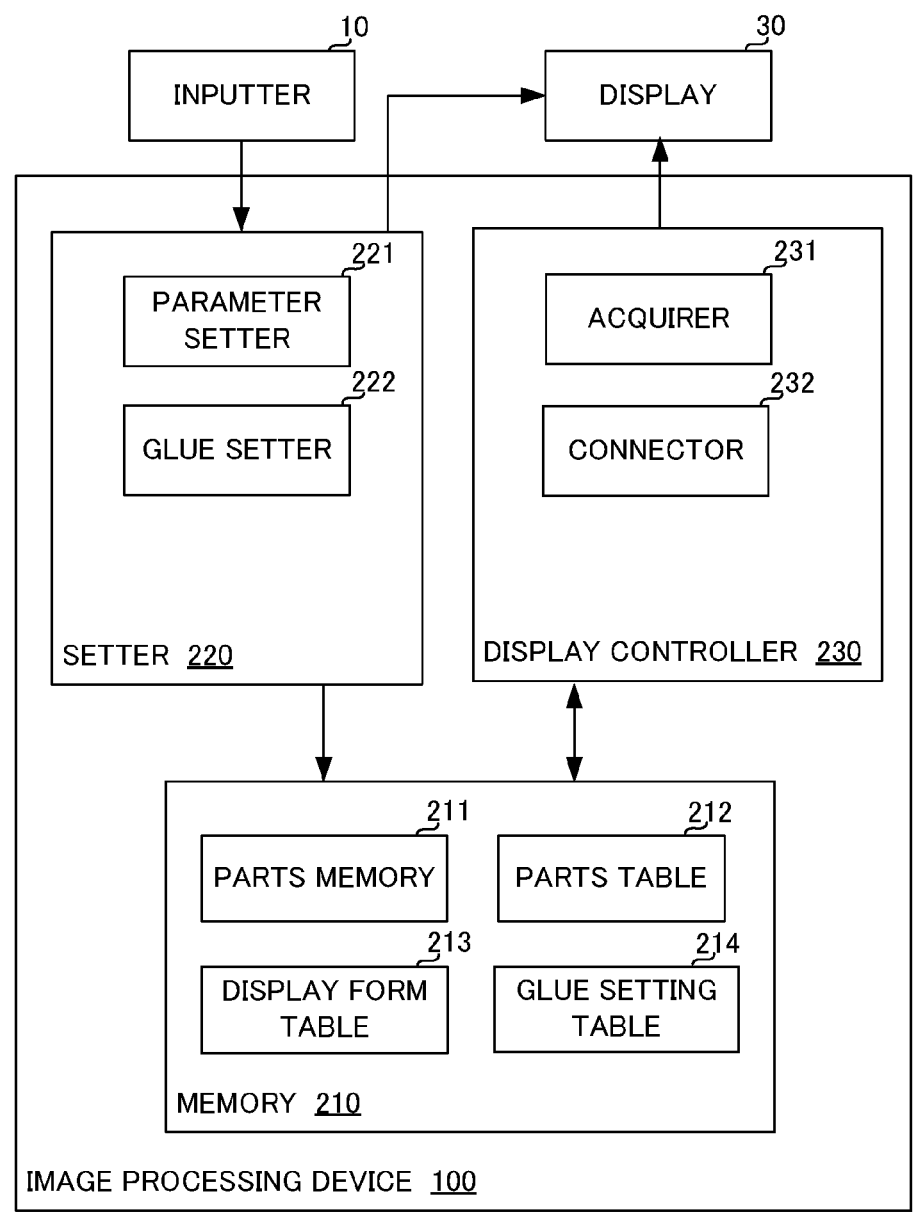
FIG. 2 is a functional block diagram of the image processing device according to the embodiment of the present disclosure.

Here, the CPU 21 reads the various programs in the ROM 22 and temporarily places the programs in the RAM 23. Then, the CPU 21 controls the image processing device 100 in accordance with the various programs, and thus realizes the function of each component as illustrated in FIG. 2. The image processing device 100 functionally includes a memory 210, a setter 220, and a display controller 230 as illustrated in FIG. 2.

Firstly, the memory 210 is constituted by the HDD 24. The memory 210 stores data in the parts memory 211 and in each type of table (a parts table 212, a display form table 213, and a glue setting table 214). The memory 210 functions as a first memory means and a second memory means.

The parts memory 211 stores each of the parts that constitute the two-dimensional model which is created beforehand by a user with image-editing software such as Photoshop or Painter. When the two-dimensional model is a person, each of parts, for example, may be a face, an eye, a nose, a neck, an upper arm and a lower arm, and so on. There may be a case in which a parallel relationship exists between, for example, the face and neck, and there may be a case in which a parent-child relationship exists between, for example, the face and an eye. Each type of table is described further below. Also, each of the parts stored in the parts memory 211 may be processed from that which is created using the image-editing software.

In the present embodiment, the user sets a parameter on a per-part basis for changing the appearance of any given part. By setting such a parameter, multiple display forms can be taken per part. Parameter setting is described below in detail.

The setter 220 includes a parameter setter 221 and a glue setter 222 and the setter 220 performs various kinds of settings based on operations from the inputter 10 used by the user. The parameter setter 221 sets a parameter for a part based on an operation from the inputter 10 used by the user. The parameter setter 221 that performs parameter setting processing is described with reference to FIG. 3. The parameter setting processing starts upon selection, via the inputter 10, of a part for which the user desires to set a parameter. Selection of a part is performed via a parts selection screen or the like displayed on the display 30.

First, the parameter setter 221 displays a selected part as the object to be edited (step S101). Specifically, the parameter setter 221 displays the part selected by the user on the display 30. For example, when the part selected by the user is the upper-arm part, the upper-arm part is displayed on the display 30.

Figures 4A, 4B:
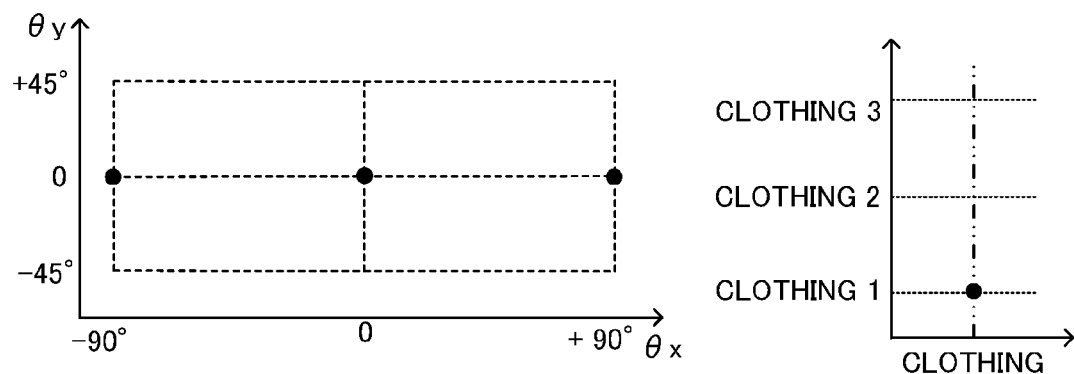
FIG. 4A is a diagram illustrating an example of a parts table.
FIG. 4B is a diagram illustrating an example of parameter values.

Next, the parameter setter 221 determines whether the parameter is received (step S102). When the parameter is received (step S102; Yes), the parameter setter 221 associates the received parameter with a part and generates a parts table 212 (step S103). For example, when parameters θx, θy, and clothing of the upper-arm part are received as parameters, the parameter setter 221 associates these parameters with the upper-arm part, generates the parts table as illustrated in FIG. 4A, and then stores the table into the memory 210.

Here, θx is a parameter indicating the rotation angle when a part is rotated around a rotation axis in a lateral direction. Also, θy is a parameter indicating the rotation angle when the part is rotated around a rotation axis in a vertical direction. The clothing is a parameter indicating the article of clothing worn by the part.

Returning back to FIG. 3, when a parts parameter is not received because of the already existing parts table and so on (step S102: No), the processing advances to step S104.

In step S104, the parameter setter 221 determines whether parameter values are received (step S104). Specifically, the parameter setter 221 determines whether the parameter values of the part selected by the user are received. For example, when the part selected by the user is the upper-arm part, the parameter setter 221 determines whether the each of the parameter values for θx, θy, and the clothing are received.

Here, when the parameter values are not received (step S104; No), the parameter setter 221 ends the parameter setting processing. On the contrary, when the parameter values are received (step S104; Yes), the parameter setter 221 generates and stores display parts of the display forms in accordance with the parameter values received and then displays the parts (step S105).

For example, as illustrated in FIG. 4B, the user has set each of the parameters (θx, θy, and the clothing) of the upper arm to (−90, 0, 1), (0, 0, 1), and (90, 0, 1), respectively. Thus, the parameter setter 221, as illustrated in FIG. 5A generates the upper arm parts of each display form A1, A2, and A3 in accordance with the received parameter values and stores the upper arm parts into the parts memory 211. By selecting the parameters set by the user, the user can switch the display form to A1, A2, or A3 and display the chosen display form on the display 30.

Here, the sign of the angle of rotation of parameter θx is illustrated as a right rotation for positive and a left rotation as negative. In FIG. 5A, the upper arm part of display form A2 corresponding to the parameter values (0, 0, 1) rotated 90° in the right-turning direction is the upper arm part of the display form A3 corresponding to parameter values (90, 0, 1), and rotated 90° in the left-turning direction is the upper arm part of the display form A1 corresponding to parameter values (−90, 0, 1).

Returning back to FIG. 3, after step S105, the parameter setter 221 generates a display form table 213 of the part based on the parameter values received (step S106) and then ends the parameter setting processing. For example, in the example of the upper arm part described above, the parameter setter 221 generates an upper arm part display form table as illustrated in FIG. 5B, stores the display form table into the memory 210, and ends the parameter setting processing.

The display form table 213 is a table in which the parameters, parameter value, display form ID and object are associated with a part ID. For example, in the display form table for the upper arm part of FIG. 5B, the parameter, parameter value, and object for each of the display forms A1, A2, and A3 are associated with part ID A of the upper arm.

Here, the object is a one composition element that makes up a part. The part is made up of multiple objects which are composition elements. The object is, for example, a line, image, or a polygon (a many-sided figure represented on a two-dimensional plane). The upper arm part for which the part ID is A is also made up of multiple objects, and by changing the multiple objects according to parameters, each of the display forms A1, A2 and A3 of FIG. 5A are displayable.

Here, the lines of an object are not limited to border lines drawn using straight lines or curved lines. This also includes shaded-in areas and gradations within an area surrounded by border lines drawn using these straight lines or curved lines. Also, the image includes pattern images such as patterns or designs as well as texture images that convey a sense of texture.

Figure 3:
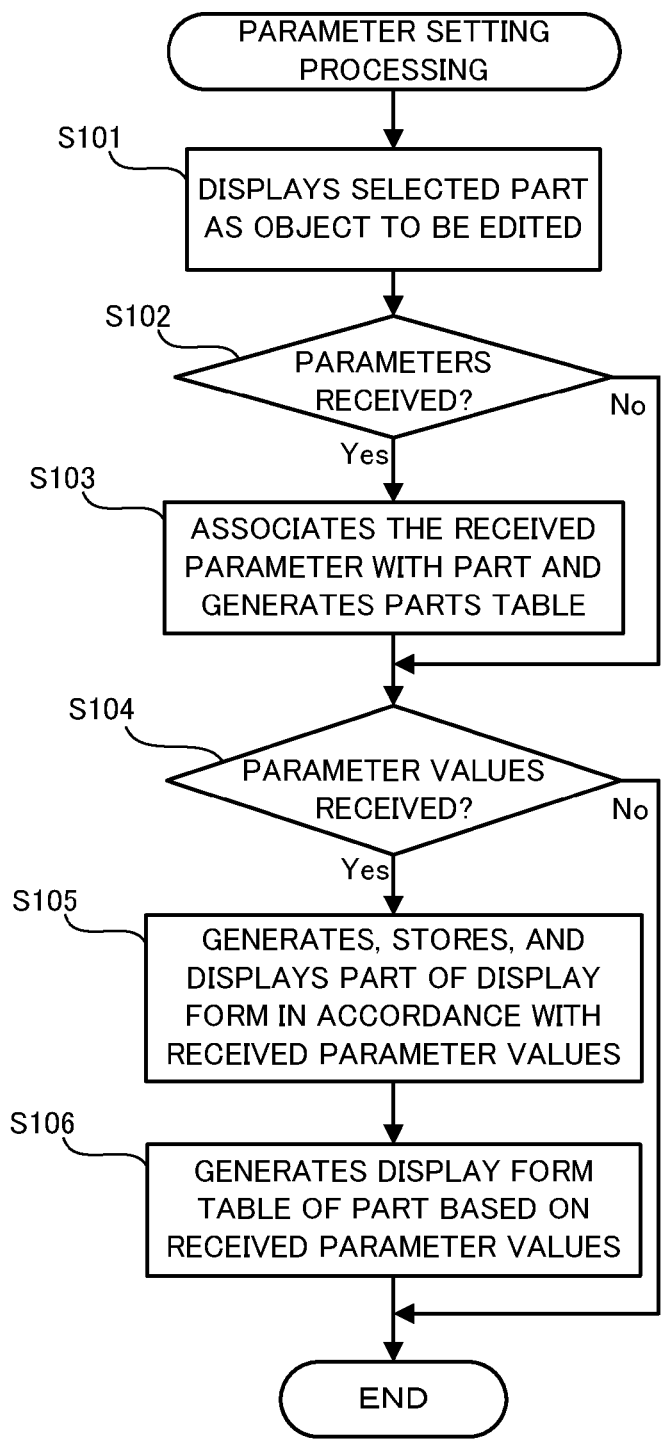
FIG. 3 is a flowchart illustrating an example of a flow of parameter setting processing.

As described, by repeating the parameter setting processing in FIG. 3, the parameter and parameter value is set for each part based on the operations from the inputter 10 by user to generate the parts table 212 and the display form table 213. The parts table and the display form table illustrated respectively in FIG. 4 and FIG. 5 are just examples of the parts table 212 and the display form table 213. Also, as the parameter setting processing gets repeated, the parts memory 211 stores multiple different display forms for the parts.

In the present embodiment, the user is deemed to have set the parameters and parameter values for the lower arm part as well as the upper arm part. Also, each of the display forms B1, B2, and B3 for the lower arm part illustrated in FIG. 5A and the display form table for the lower arm part illustrated in FIG. 5B are deemed to have been generated and stored by the parameter setting processing.

In the description below, the upper arm part of each of display forms A1, A2, and A3 are referred to as upper arm parts A1, A2, and A3. Also, the upper arm part that has no specific display form is referred to as upper arm part A, which is the broader concept of these display forms of the upper arm part. The same applies for the lower arm part.

Returning back to FIG. 2, the glue setter 222 sets connection information regarding connection with glue for each of the different display forms of a part stored in the parts memory 211 based on operations from the inputter 10 used by the user.

Figure 6:
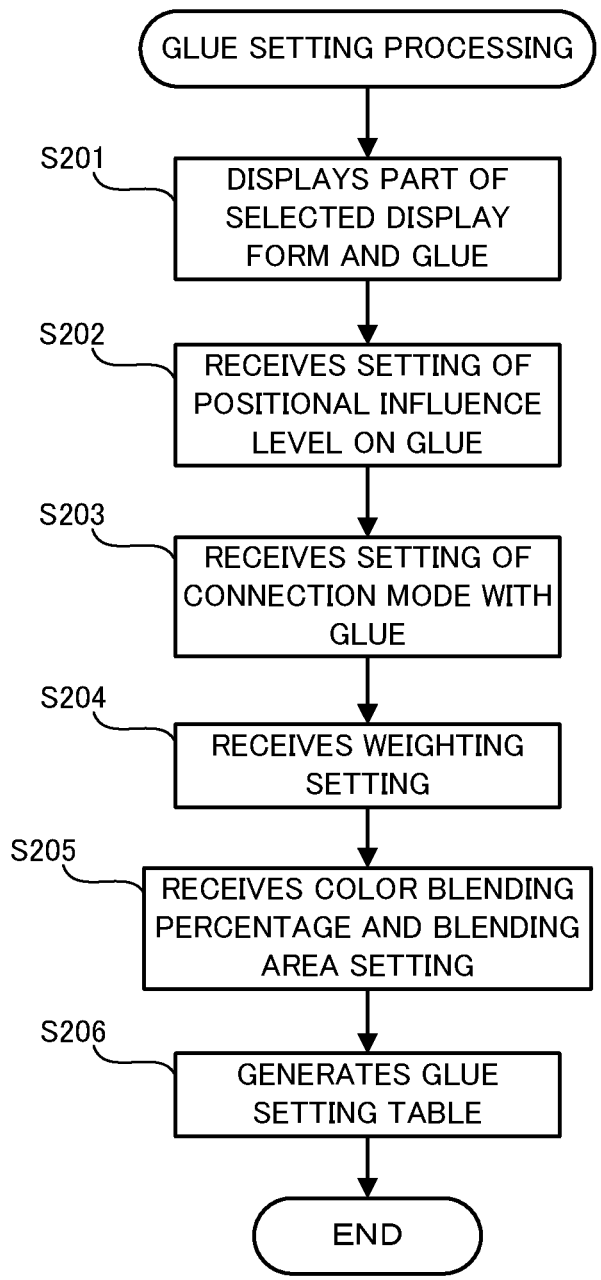
FIG. 6 is a flowchart illustrating an example of a flow of glue setting processing.

Here, the glue is a connection medium that serves as a medium for connecting together parts that are separated on a two-dimensional plane. In the present embodiment, one part is connected with another part based on connection information set between the glue and a display form of one part and connection information set between the glue and a display form of the other part with which to be connected. The glue setter 222 sets the connection information, which is the precondition, based on a user operation. Here, glue setting processing, which is conducted by the glue setter 222, is described with reference to FIG. 6. The glue setting processing starts upon selection of the glue setting mode, via the inputter 10, while a part of a display form for which the user desires to set connection information between the glue and the part, is selected. In order to select the glue setting mode, the user may, for example, press down the glue setting mode button via a mouse of the inputter 10 while a part is selected. Instead, the user may select the glue setting mode by displaying the menu and then right-clicking on the selected part with the mouse.

First, the glue setter 222 displays the part of the selected display form, and the glue G (step S201). More specifically, the glue setter 222 displays the part of the display form selected by the user and the glue G on the display 30. For example, when an upper arm part A2 is selected, the upper arm part A2 and the glue G are displayed apart from each other on the display 30, as illustrated in FIG. 7A.

The glue G is displayed apart from the upper arm part A2 somewhere on a two-dimensional plane, and the position and the size of the glue G can be freely changed through user operation. The user adjusts the position and the size of the glue G using the inputter 10 so that the glue G fits onto the upper arm part A2. Thus, the glue G portion is the connection portion to which another part is connected.

Next, the glue setter 222 receives the setting of a positional influence level on the glue G (step S202). The positional influence level indicates the degree to which the part attracts the glue G. In FIG. 7A, although the user fits the glue G to the upper arm part A2, the glue G is pulled in accordance with the positional influence level set in the other connection destination part during the actual connection processing, thereby adjusting the position of the glue G and determining the connection position of the parts. Therefore, the user who sets the positional influence level sets to what degree the glue G, which is the connection position, is attracted while taking into consideration the other connection destination part. Therefore, the positional influence level is also referred to as position information, which indicates the positional relationship between the parts and the glue G.

Here, when the user, for example, sets the positional influence level between the upper arm part A2 and the glue G to 50% via the inputter 10, the glue setter 222 receives the positional influence level setting of 50%.

Next, the glue setter 222 receives the setting of the connection mode with the glue G (step S203). The connection mode is a connection mode with respect to the glue G of which the position is adjusted based on the positional influence level. For example, the connection mode may be extend, move, and the like. Here, when the user, for example, sets, via the inputter 10, the connection mode with the glue G to extend from the upper arm part A2, the glue setter 222 receives the extend setting as the connection mode.

Next, the glue setter 222 receives the weighting setting (step S204). The weighting indicates the degree to which a connection portion and a non-connection portion of a part of a selected display form, deforms.

Specifically, the user sets weighted positions of the upper arm part A2 at the diamond shape positions and sets the magnitude of the weight by adjusting the size of the diamond shapes via the inputter 10 as illustrated by the diamond shapes in FIG. 7A. Then the glue setter 222 receives the weighting setting that contains the weighted positions and the magnitude of the weight. Specifically, the glue setter 222 acquires the position coordinates on a two-dimensional plane from the diamond shape positions, acquires the value indicating the weight based on the size of the diamond shape, and receives these as weightings, which is one type of connection information between the upper arm part A2 and the glue G.

The weighting is a reference (deformation location and deformation level) for performing deformation after the parts are connected (for example, after the upper arm part A2 is connected to the connection destination part) so that the connection portion and the non-connection portion are naturally coupled. For example, the example given in FIG. 7A indicates that the connection portion greatly deforms at two diamond shape positions. On the other hand, at the four diamond shape positions on the non-connection portion (namely, the portion of the upper arm part A2) the deformation amount is less than the connection portion. Deformation utilizing the weighting enables the parts to couple naturally.

Next, the glue setter 222 receives the color blending percentage and the blending area setting (step S205). The color blending percentage indicates the degree to which the color of the part of the selected display form is blended with the color of the connection destination part. Also, the blending area is the area in which the color of the part of the selected display form is blended with the part of connection destination part. Here, when the user, for example, does not set the color blending percentage and the blending area for the upper arm part A2, the glue setter 222 receives a "0" indicating that neither of the parameters was set.

Next, the glue setter 222 generates the glue setting table (step S206). Specifically, the glue setter 222 generates the glue setting table 214 between the display form of the selected part and the glue G based on the settings of the positional influence level, the connection mode, the weighting, the color blending percentage and the blending area received in each of the steps S202 through 205 and then stores the table into the memory 210.

In the aforementioned upper arm part example, the glue setter 222 generates an upper arm part A2 glue setting table for which connection information between the display form A2 and the glue G illustrated in FIG. 7B is set, and stores the table into the memory 210. In this way, by repeating the glue setting processing, a glue setting table containing set connection information regarding connection between each of the different display forms of a part (for example, each of the display forms A1, A2, and A3 of the upper arm part A) and the glue G, is generated and stored.

In the present embodiment, in addition to the upper arm part A2, the user also set the positional influence level and the like for the lower arm part B2, and the lower arm part B2 glue setting table illustrated in FIG. 8B is generated by the glue setting processing. The lower arm part B2 glue setting table illustrates that the user set the color blending area as indicated by the broken line in FIG. 8A, and the blending percentage, to 50%.

The steps in glue setting processing described above may be arranged in any sequence. Also, any step not necessary may be skipped. Also, the setting of the value of the positional influence level, the connection mode selection, the value of the color blending percentage, and the like can be performed by the user via any setting screen or the like. Also, although the weighted position and magnitude in the glue setting table is indicated in the form of a diamond shape, in actuality, the positional coordinates of the weight and the value of the magnitude of the weight (for example, a weight with a value ranging from a minimum of one to a maximum of ten in accordance with the size of the diamond shape) are stored. Also, the diamond shape is merely an example, and any shape and/or method may be used for setting the weight as long as they are recognizable to a user.

Also, for the parameter setting processing and the glue setting processing described above, the parts related to settings are made to be displayed on the part display 30 (steps S101 and S201) but what is displayed is not limited to this example. For example, the steps S101 and S201 described above may be skipped as long as either of the above described processing begins upon selection by the user of a part related to settings while each of the parts of the two-dimensional model are displayed on the display 30.

It is assumed that the above-described parts generation of different display forms through the parameter setting processing and generation of connection information through the glue setting processing should be performed as preprocessing in order to connect the parts together. The functions pertaining to connection based on these two types of preprocessing are described in detail below.

Returning back to FIG. 2, the display controller 230 includes the acquirer 231 and the connector 232, which provide connection-related functions. The display controller 230 performs display control on the display 30 after parts are connected. The display controller 230 functions as a display control means.

The acquirer 231 acquires the connection information set between the display form of one of the parts displayed on the display 30 and the glue, from the glue setting table of the part of the given display form. The acquirer 231 also acquires the connection information set between the display form of the other part displayed on the display 30 and the glue from the glue setting table. The acquirer 231 functions as a first acquisition means and a second acquisition means.

The connector 232 connects one of the parts with another part displayed on the display 30 based on the two sets of connection information acquired by the acquirer 231. The connector 232 functions as a connection means.

Here, the connection processing by the acquirer 231 and the connector 232 are described with reference to FIG. 9. The connection processing presupposes that there is a glue setting table for each of the two parts displayed on the display 30 where, in other words, both parts should be in a connection state by using the connection information set in preprocessing. The placement position and placement orientation on a two-dimensional plane of the two parts displayed on the display 30 are determined in accordance with the pose of the two-dimensional model (the overall posture of the two-dimensional model). When two parts should be connected (when the parts are separated from each other due to having different placement positions, and there is connection information set in preprocessing) in order to draw and display the two parts in a placement position and placement orientation determined in accordance with the pose of the two-dimensional model, the connection processing begins prior to the display. The placement position mentioned indicates position coordinates where the part is placed on a two-dimensional plane. Also, the placement orientation indicates the direction in which the part is facing at the above-mentioned position coordinates determined in accordance with the pose of the two-dimensional model.

When the connection processing begins, processing is performed in the order described below.

First, the acquirer 231 acquires connection information from the glue setting tables belonging to each of the two parts to be connected (step S301). For example, when the one of the parts is the upper arm part A2 and the other part is the lower arm part B2, which are both displayed on the display 30, the acquirer 231 acquires the connection information included in the A2 glue setting table and acquires connection information included in the B2 glue setting table, from the memory 210.

Figure 10:
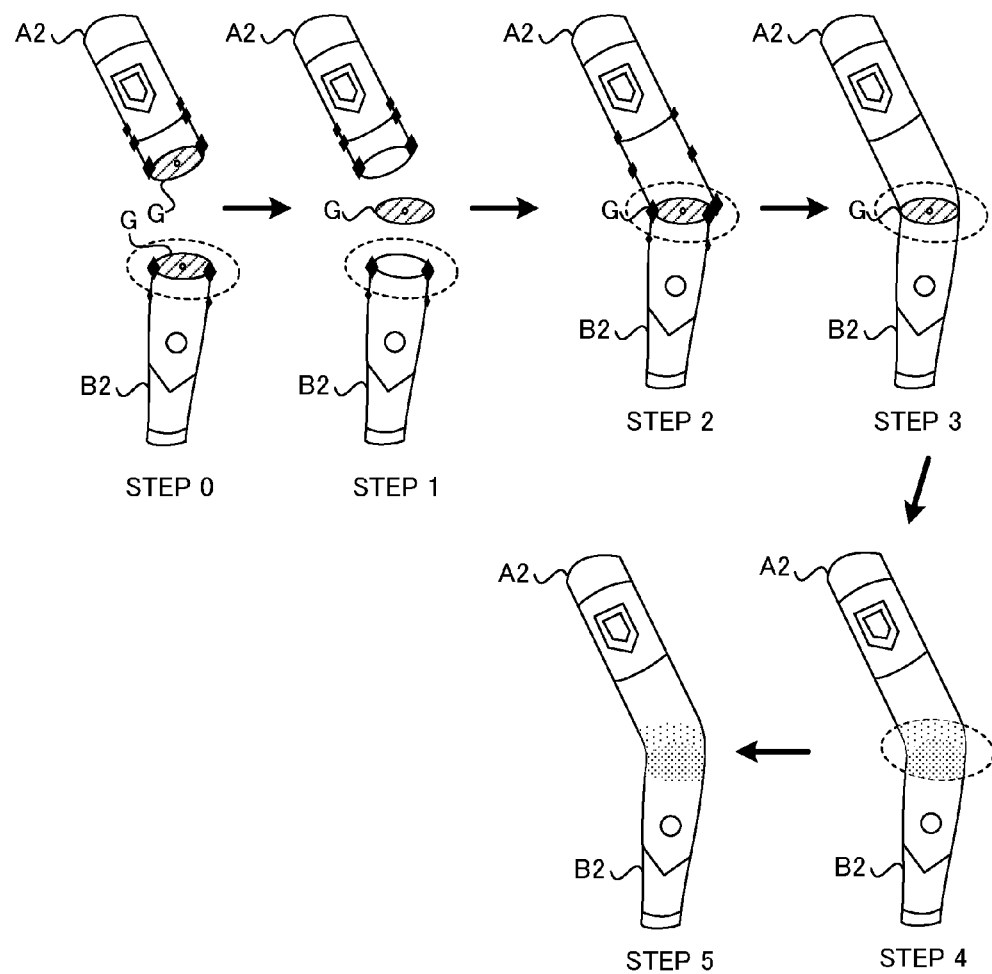
FIG. 10 is diagram sequentially illustrating each step in the connection processing.

Next, the connector 232 adjusts the connection position of both of the parts based on the two positional influence levels (step S302). For example, the placement position and the placement orientation on a two-dimensional plane of the upper arm part A2 and the lower arm part B2 determined in accordance with a pose of a two-dimensional model is illustrated in step 0 of FIG. 10. In this case, since the positional influence level contained in the connection information of the upper arm part A2 is set at 50% (Refer to A2 glue setting table in FIG. 7B.) and the positional influence level contained in the connection information of the lower arm part B2 is set to 50% (Refer to the B2 Glue Setting Table in FIG. 8B.), they both attract the glue G with equal force. Therefore, the connector 232 sets the position of the glue G, which is the connection position, to an intermediate position between both of the parts (Refer to step 1 of FIG. 10.). The glue G, which is the connection position, may be newly generated based on both of the glues G of the upper arm part A2 and the lower arm part B2 in step 0 and the connection position may be formed by using just one of the glues G.

Next, the connector 232 connects both parts by each of the connection modes with respect to adjusted connection position (step S303). For example, when the connection mode of the upper arm part A2 is extend and the connection mode of the lower arm part B2 is move, the upper arm part A2 stretches and connects with the connection position of the adjusted glue G and the lower arm part B2 moves and connects with the adjusted glue G connection position (Refer to step 2 of FIG. 10.). Here, the position of the diamond shapes (weighted positions) change together with the change of the connection mode.

Next, the connector 232 deforms the connection portion based on the weighting (step S304). For example, connection portions of the upper arm part A2 and the lower arm part B2 are deformed based on the weighting set in FIGS. 7A and 8A so as to couple together naturally (Refer to step 3 of FIG. 10.). Step 3 of FIG. 10 indicates significant deforming at the positions of the large diamond shapes on the connection portions. On the contrary, deforming is less significant at positions of the diamond shapes on the non-connection portions (the upper arm part A2 and the lower arm part B2 portions). Thus the connection portions couple together naturally without any malformation.

Next, the connector 232 determines whether there is color blending (steps S305). Specifically, the connector 232 makes the above-described determination based on whether color blending percentage and blending area for one or both of the parts is set.

When there is no color blending (step S305; No), the display controller 230 displays the connected parts on the display 30 (step S307), and then the connection processing ends.

Alternatively, when there is color blending (step S305; Yes), the connector 232 performs color blending based on the blending percentage and the blending area (step S306). For example, in the B2 glue setting table, the color blending percentage is 50% and since the color blending area is the area indicated by the broken-line ellipse, the color of the lower arm part B2 is blended with the upper arm part A2 at a blending percentage of 50% (step 4 of FIG. 10).

Next, after color blending is performed, the connected parts are displayed on the display 30 in step S307 (step 5 in FIG. 10), and then the connection processing ends.

According to the above-described connection processing, when separated parts are each set with connection information, the inclusion of the acquirer 231 and the connector 232 in the image processing device 100 enables the connection information to be utilized for connecting together the parts.

In preprocessing, the user may set the connection information between each display form of the part and each glue. For example, when there are ten display form variations of a part and there are ten display form variations for another part connected thereto, the user may set connection information between each of all twenty variations and glue.

In other words, the user is free from the task of having to edit the connections for all the possible combinations, 10×10=100 patterns. Moreover, even if the display forms increase for one or both of the parts, the user may set the connection information for the display forms increased and the user is free from the task of having to edit in order to connect the increased display forms of the part with all of the display forms of the connection destination part. Also, since there is no need to perform the editing task for all of the combinations, there is no need to store the data for all combinations. This enables the two-dimensional parts to be connected while keeping user workload and storage capacity to a minimum.

In other words, the connection medium (glue) resolves the technical issue of the difficulty in displaying a joint of the parts of a two-dimensional model in a way that looks natural, and resolves the technical issue of the storage capacity having to be increased.

Also, in preprocessing, the user set various types of information as connection information. Moreover, in the connection processing, the various types of set information are utilized (for example, the weighting, color blending, and the like are utilized) to naturally connect the parts together. This enables the joint of the two-dimensional parts to be connected in a natural manner while keeping user workload and storage capacity to a minimum.

Also, in the present embodiment, the new technical idea of providing glue that neutrally intermediates a connection is adopted in order to naturally connect two-dimensional parts that were drawn without taking connection into account. This resolved the technical issue of connecting separated two-dimensional parts together, which does not occur in a three-dimensional model.

In the above-described connection processing, although an example was given in which the connection mode of the upper arm part A2 is extend and the connection mode of the lower arm part b2 is move, but the connection modes are not limited to these examples. Another connection mode is described below with reference to FIG. 11.

Figure 11:
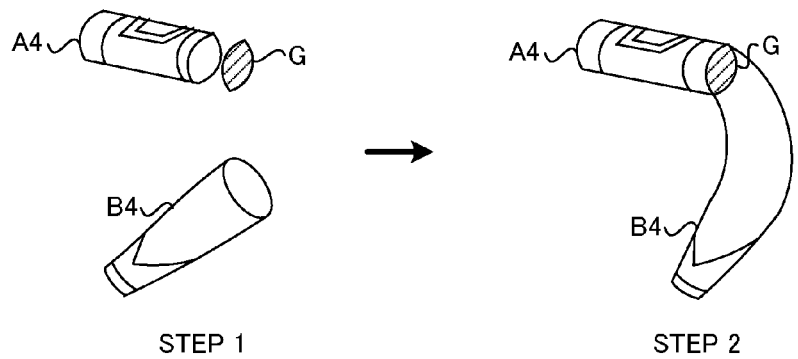
FIG. 11 is a diagram illustrating another example of a connection mode among the various steps in the connection processing.

In step 1 of FIG. 11, is a scene (corresponding to step S302 in the connection processing of FIG. 9) in which the connection position with respect to an upper arm part A4 and a lower arm part B4 is adjusted based on positional influence level contained in the connection information of both parts. This scene indicates that glue G, which is the connection position, is being pulled toward the side of the upper arm part because the positional influence level of the upper arm part A4 is greater than the positional influence level of the lower arm part. In addition to the θx, θy, and clothing as parameters for parts, the size is set and the size of the upper arm part A4 and the lower arm part B4 are different.

In this case, although the connection mode of the upper arm part A4 may be set as extend, natural connection is not achievable just by setting the connection mode of the lower arm part B4 to either move or extend. In such a case, the connector 232 corrects the orientation and the size of the lower arm part B4 while extending the lower arm part B4 (Refer to step 2 of FIG. 11.).

In step 2 of FIG. 11, the connection is natural because the connection orientation and the size of the connection portion of the lower arm part B4 are corrected and the lower arm part B4 extends along a smooth curve. In this way, even when two parts are not connectable with just one connection mode (when the size and orientation of two parts are different, for example) the connector 232 connects both parts by combining connection modes so as to attain a natural connection.

Regarding the setting of the connection mode, so as to be prepared beforehand when the size and/or orientation are different, the user may set multiple connections (for example, a correction option may be set in addition to setting extend as the connection mode). Alternatively, in addition to the one connection mode set by the user, the connector 232 may automatically perform corrections, and the like.

Modified Example

The description of the above-described embodiment is finished but the specific configuration of the image processing device 100 is not limited to the description in the above-described embodiment.

Figure 12:
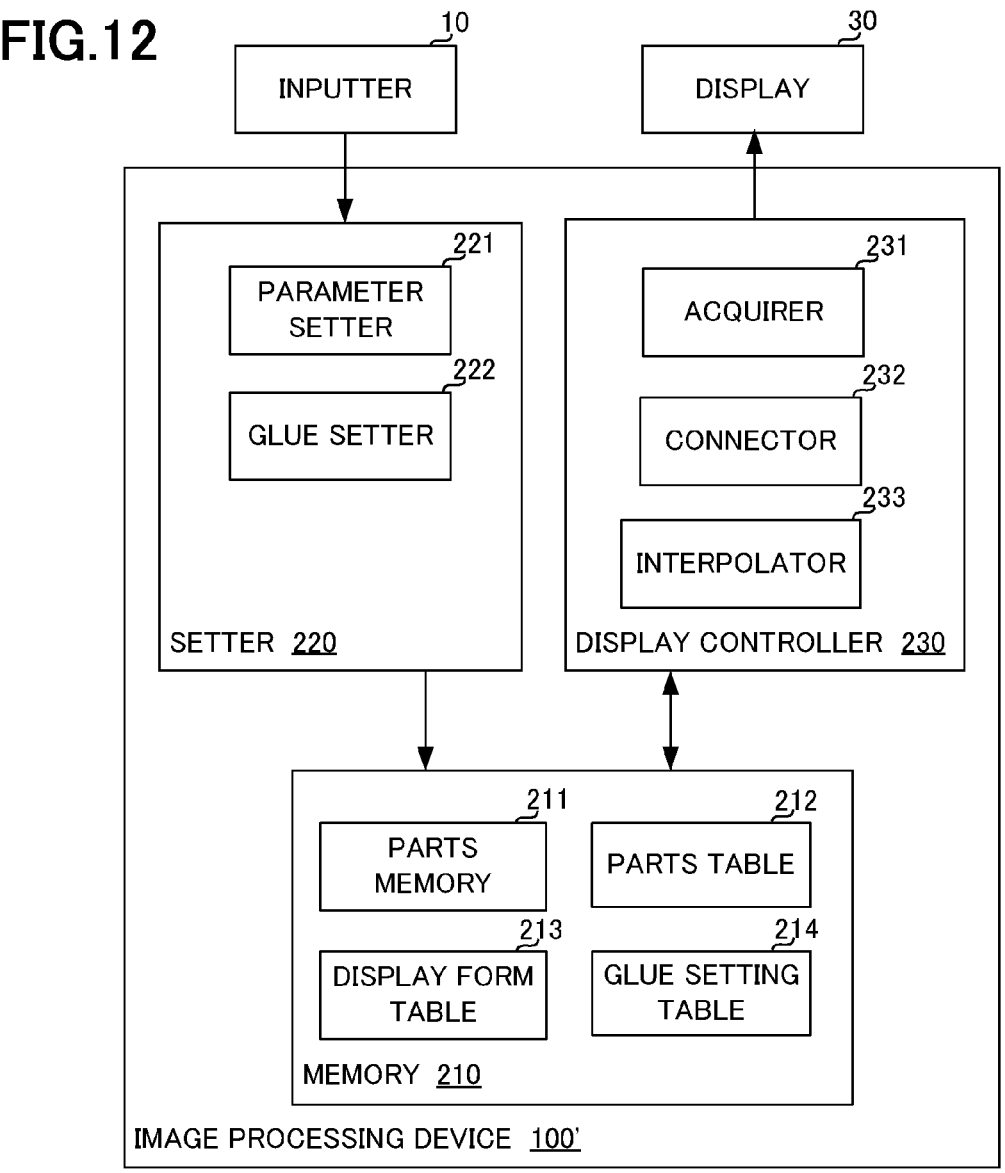
FIG. 12 is a diagram illustrating functional block diagram of an image processing device according to a modified example.

For example, the image processing device 100 may be changed into an image processing device 100' illustrated in FIG. 12 as a modified example. The image processing device 100' is different from the image processing device 100 in that the image processing device 100' includes an interpolator 233. The hardware configuration is the same as the image processing device 100. Also, the interpolator 233 functions as a first interpolation means and a second part interpolation means and a first connection information interpolation means and a second connection information interpolation means.

In the above-described embodiment, the multiple display forms are stored for each part with the assumption that display forms are switched based on user operation. In this modified example, instead, interpolation is performed on a particular part based on the parts of the display form set by the user. Interpolation is described in detail below.

The interpolator 233 performs 1) part interpolation and 2) connection information interpolation.

Figure 13A:
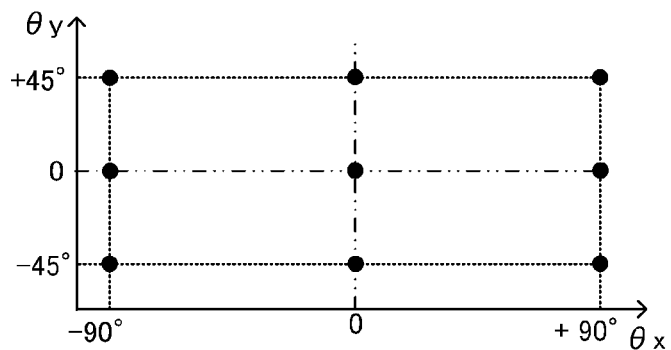
FIG. 13A is a diagram illustrating an example of a parameter values in the modified example.

1) When performing parts interpolation, the user sets multiple settings for parameters of a part and generates a part that indicates multiple display forms in advance in the above-described parameter setting processing. In the parameter values example of FIG. 13A, through the parameter setting processing performed beforehand by the user, the upper arm part A that can indicate the nine display forms illustrated by black dots is generated.

The interpolator 233 generates a part of the display forms between the nine dots and performs interpolation based on the parameter value between each of the black dots. Parts interpolation enables the upper arm part A, for example, to have nine or more display forms.

Figure 13B:
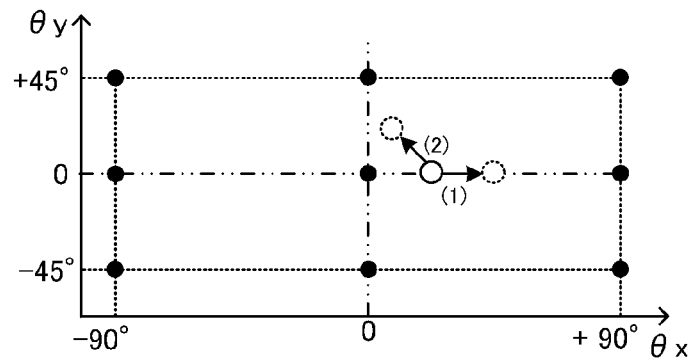
FIG. 13B is a diagram illustrating an example of a parameter values displayed on a display.

Here, the display controller 230 displays the parameter values illustrated in FIG. 13B on the display 30 so that user can freely change the display forms. The user may freely move a white dot via the inputter 10, such as a mouse or the like. The interpolator 233 receives the position of the white dot and performs parts interpolation based on the parameter values of the positions. Interpolation processing is described with reference to FIG. 14. The interpolation processing begins when the user changes the position of the white dot.

First, the interpolator 233 determines whether there is a part of a display form in accordance with the parameter values received (step S401). When, for example, the position of the white dot overlaps with a black dot, in other words, when the part of a display form already exists (step S401; Yes), the interpolation processing ends as there is no need to perform interpolation. When there is no need to perform the above-described connection processing (when there is no connection destination part) after the interpolation processing ends, the display controller 230 displays the part that is set of the display form that already exists, as is, on the display 30. When the connection processing should be performed (when the connection destination part exists and the part has connection information) the connection processing is performed, and then the connected parts are displayed on the display 30.

On the contrary, when no part of the display form in accordance with the parameter values received exists (step S401; No), that is, when the position of the white dot does not overlap with a black dot and is between one pair of black dots, the interpolator 233 interpolates the part of the display form based on the parameter values received corresponding with the position of the white dot (step S402).

As an example, the user changed the position of the white dot to the position shown by the arrow (1) in FIG. 13B. In this case, the parameter values (θx, θy, clothing) received by the interpolator 233 parameter are values (45, 0, 1), which are between the upper arm part A2 parameter values (0, 0, 1) and the upper arm part A3 parameter values (90, 0, 1). The interpolator 233 generates an upper arm part A' between the upper arm part A2 and the upper arm part A3 (Refer to FIG. 15A.) based on the above-given data. This process is referred to as parts interpolation.

Although the parts interpolation is described based on arrow (1), when the user moves the position of the white dot to the position shown by arrow (2) in FIG. 13B, naturally, parts interpolation is performed based on the parameters values of the new position.

Next, 2) connection information interpolation is described.

The interpolator 233 interpolates connection information between the display form of the interpolated part and the glue G (step S403). For example, the interpolator 233 interpolates connection information between the interpolated upper arm part A' and the glue G based on the connection information set between the upper arm part A2 and the glue G (Refer to upper arm part A' interpolation table in FIG. 15B.) and the connection information set between the upper arm part A3 and the glue G. This processing is referred to as connection information interpolation.

Here, when the positional influence level of the upper arm part A2 and the upper arm part A3 is 50% and 80%, respectively, as indicated in the A' interpolation table in FIG. 15B, the interpolator 233 interpolates the positional influence level between the upper arm part A' and the glue G at 65%, which is the intermediate value. Also, since the color blending percentage and the blending area are only set for the upper arm part A3, the upper arm part A' is set with a blending percentage of 40%, which is the intermediate value, and set with a blending area. Since the weighted positions of the upper arm parts A2 and A3 are slightly different (excluding when the weighted position coordinates of different display forms totally overlap) the weighted position of the upper arm part A' is made to have an intermediate coordinate value of the upper arm parts A2 and A3.

Doing so thereby enables the interpolation of the connection information so as to cause the positional influence level to strengthen gradually (the connection position is attracted gradually due to the relation with the connection destination part) and cause blending to occur gradually.

In this example, since there is no difference in the weight magnitude of the upper arms parts A2 and A3, the weight magnitude of the interpolated upper arm part A' is also the same but when the weight magnitude (size of the diamond shapes) are different, interpolation is performed so as to set the weight magnitude to an intermediate value. Also, when the connection modes are different, for example, when the upper part A2 is set to extend and the upper arm part A3 is set to move, the connect mode that is to be interpolated may become a combination of the extend and move connection modes. For example, in the connection mode to be interpolated, half may be set to stretch and the other half may be set to move and connect with respect to the glue G determined by the relation.

Also, in this example, the only difference in the display form between the upper arm parts A2 and A3 is in the rotation angle θx, and although both parts are of the same size, there may also be cases in which the size is changed as a parameter (for example, when the upper arm part A3 is larger than the upper arm part A2). The A2 and A3 might also be placed in different orientations in accordance with the pose of a two-dimensional model. In such a case, the glue G may not fit on the interpolated upper arm part A' when the size and the position of the glue G remain the same.

Therefore, when the size or orientation is different, the interpolator 233 corrects the actual glue G size and positional deviations based on the parameter values of the interpolated upper arm part A' (an intermediate size between A2 and A3 with the orientation having an intermediate angle of the angular difference caused by the different orientations of A2 and A3). Thus, automatic interpolation of the glue G, which is the connection portion, is performed to correspond to the upper arm part A' interpolated between the upper arm parts A2 and A3 which have different sizes and orientations.

Figure 14:
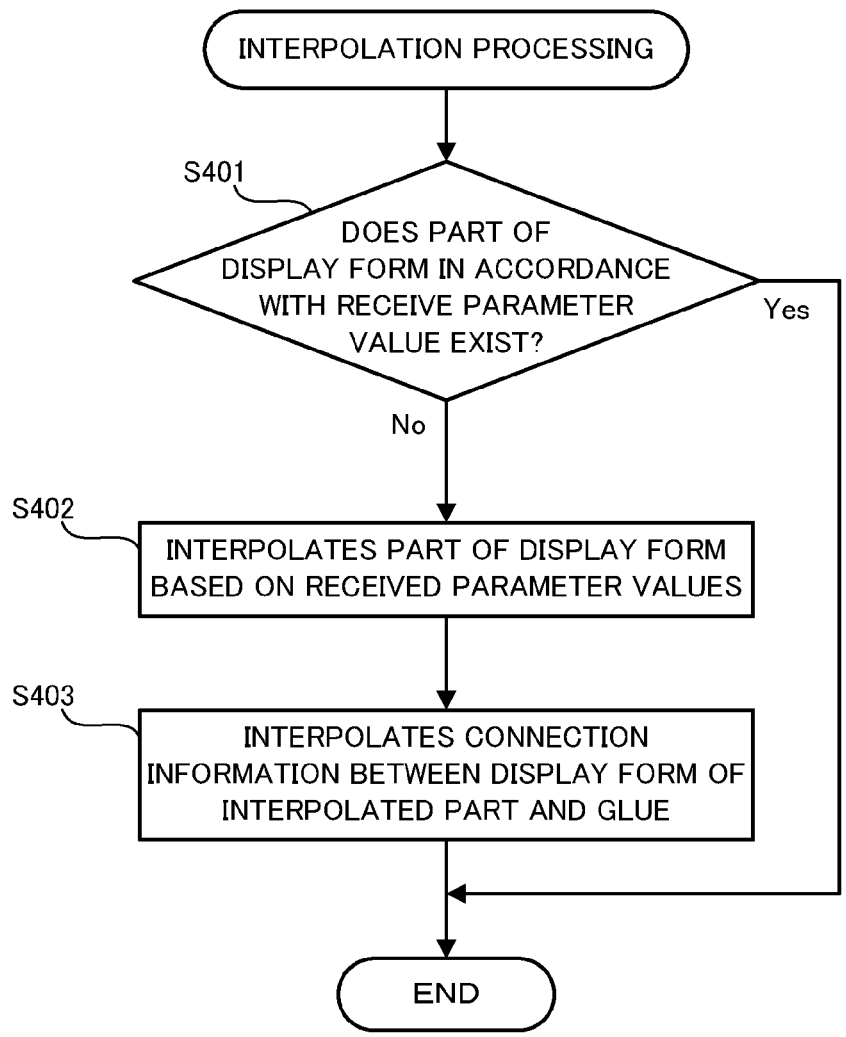
FIG. 14 is a flowchart illustrating an example of a flow of interpolation processing.

Returning back to the interpolation processing in FIG. 14, interpolation processing ends after the connection information is established in step S403. After interpolation processing, the display controller 230 displays the interpolated parts, as is, on the display 30, as long as above-described connection processing is not necessary. When the connection processing should be performed, the connected parts are displayed on the display 30 upon completion of the connection processing of the interpolated parts.

At this point, the connection processing is deemed necessary when there is both interpolated connection information between the interpolated parts and the glue G and interpolated connection information at the connection destination part. The parts are connected together through the above-described connection processing of FIG. 9.

Here, for example, a lower arm part B' is interpolated between lower arm parts B2 and B3 (Refer to FIG. 16A.) through the above-described interpolation processing and the connection information is interpolated between the lower arm part B' and the glue G (Refer to the lower arm part B' interpolation table in FIG. 16B.). As for the timing of the interpolation processing, since the parameter for the upper arm and the lower arm parts is the same, the interpolation processing of the lower arm and upper arm parts may take place at the same time when the user moves the above-described white dot via the inputter 10.

Figure 9:
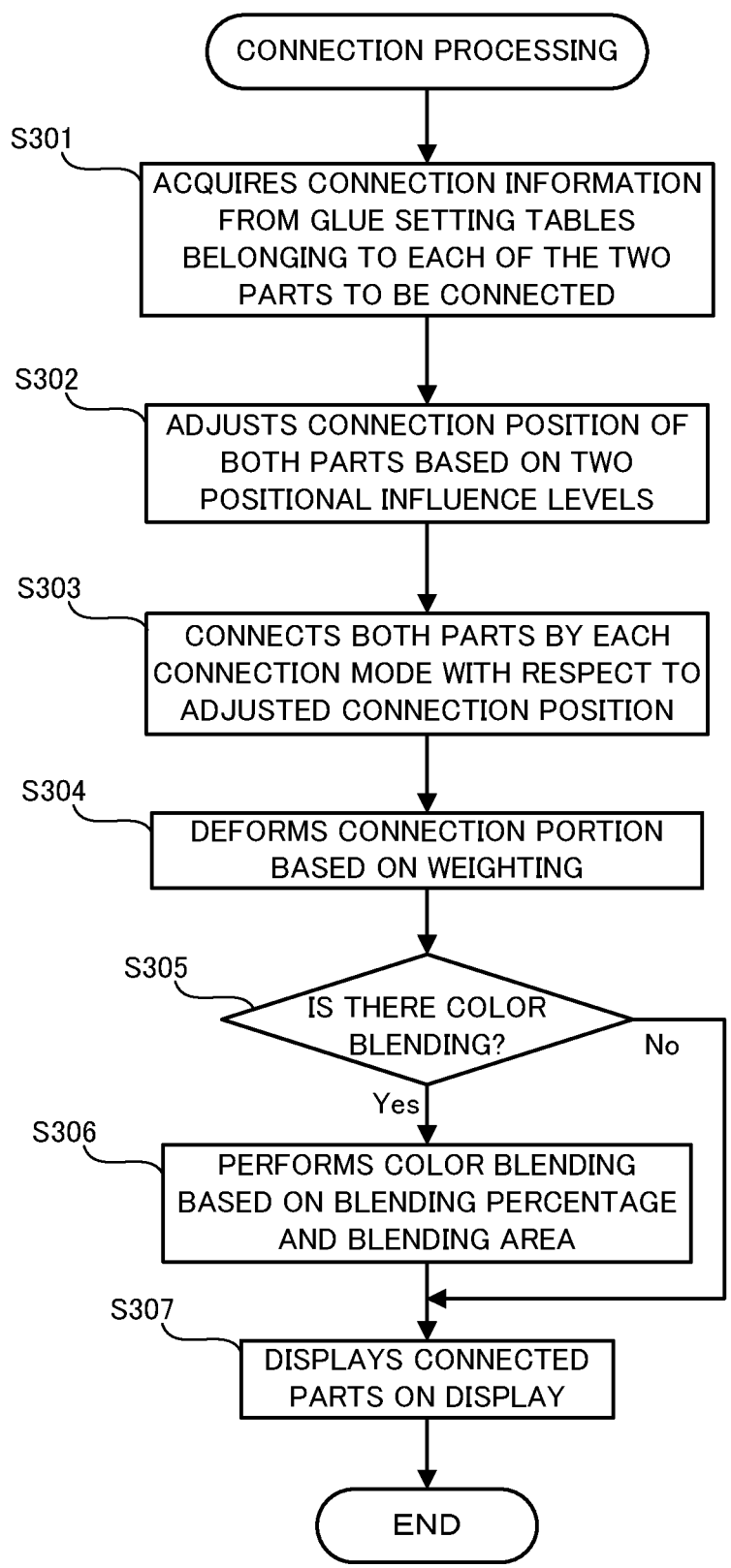
FIG. 9 is a flowchart illustrating an example of a flow of connection processing.
Figure 17:
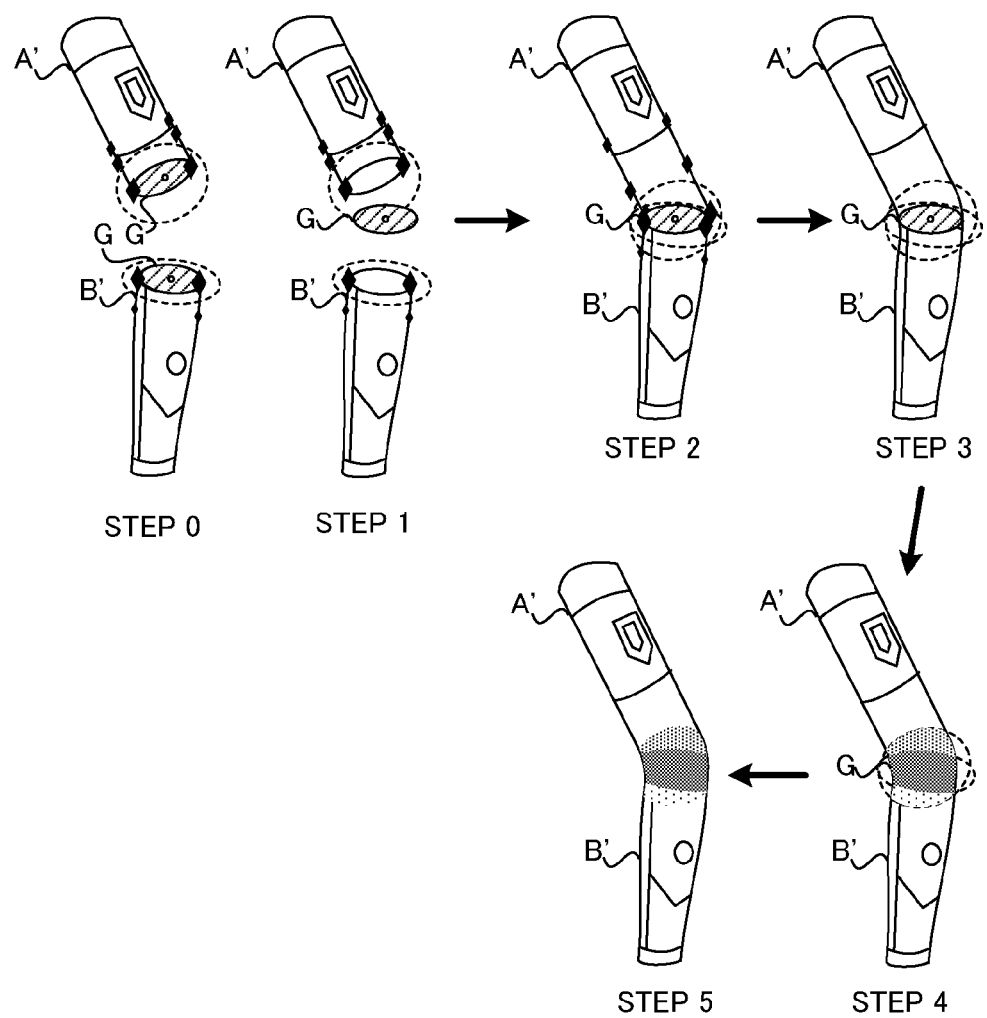
FIG. 17 is a diagram sequentially illustrating an example of each step in the connection processing which follows after interpolation.

Also, the interpolated upper arm part A' and the interpolated lower arm part B' are connected together through the above-described connection processing of FIG. 9 based on connection information of both sets of the interpolated connection information. Here the placement position and the placement orientation of the interpolated upper arm part A' and the interpolated lower arm part B' are described according to step 0 illustrated in FIG. 17. First, the connector 232 adjusts the connection position of both parts based on the two positional influence levels. At this point in time, since the 65% positional influence level of the upper arm part A' is higher than the 35% positional influence level of the lower arm part B', the connection position is slightly attracted toward the upper arm part A' (Refer to step 1 in FIG. 17.).

After the connector 232 connects in the connection modes of each part with respect to the adjusted connection positions (Refer to step 2 of FIG. 17.) and deforms the parts based on the weightings (Refer to step 3 within the same figure.), the color blending is performed (Refer to step 4 within the same figure). At this point, since both of the interpolated parts are set with their own blending percentage and blending area, the colors of both parts get blending together within the overlapping portion of the ellipses. Also, the display controller 230 displays the connected parts on the display 30 (Refer to step 5 within the same figure.).

In the modified example described above, the image processing device 100' includes the interpolator 233, and, the interpolator 233 is made to perform parts interpolation and connection information through the interpolation processing. The parts may be continuously interpolated by repeating the interpolation processing (for example, by repeating processing each time the position of a white dot changes). Also, after interpolation processing, the display form of the parts may be continuously changes in a gradual and smooth manner by displaying the interpolated parts in a connected or non-connected state on the display 30, depending on whether the connection processing is carried out. Therefore, compared with the above-described embodiment in which the display form changes in a non-continuous manner, interpolation enables the number of variations of display forms to be increased. Moreover, the joint portion of the parts can be displayed in a way that looks natural while performing the connection.

Although the upper arm part and lower arm part examples were mainly described in the aforementioned embodiment and modified example, these examples are not limiting, and the above-described connection processing and interpolation processing may be applied to any of the parts in a two-dimensional model that require connecting (such as a face and neck, neck and torso, or lower arm and hand).

Also, the parameters set based on user operations in the parameter setting processing are just examples; the user may set multiple parameters relating to each part in a two-dimensional model. Also, the connection information set based on user operations in the glue setting processing is just an example; the user may select multiple types of information useful for performing connections.

Also, while the aforementioned embodiment and modified example presuppose that there is just one glue, this is not limiting. For example, in the glue setting processing, different connection information may be set for glue G1 and G2 with respect to a part of a display form. In such a case, connection information may be used selectively as long as a usage condition is set that dictates which glue is to be used. For example, a usage method in which the glue G1 is in used in normal situations and the glue G2 is only used in exceptional situations (for example, connection information used with a specific connection destination part) may be considered.

Also, while the aforementioned embodiment and modified example presuppose that glue is a medium for connecting two parts together, this is not limiting. The glue may be used as a medium for connecting three or more parts together. For example, three parts may be connected together based on connection information of the three parts that are connectively related.

Also, while the aforementioned embodiment and modified example presuppose that the glue is a medium for connecting non-interpolated parts or interpolated parts, this is not limiting. The glue may serve as a medium for connecting a non-interpolated part with an interpolated part.

Also, when there are multiple display forms for a particular part, configuration may be carried out so that interpolation is performed between particular display forms while no interpolation is performed on the remaining display forms of the parts. For example, when the upper arm part A has display forms A1 through A6, such that interpolation is performed between A1 and A4 yet no interpolation is performed between A4 and A6, discontinuous switching can be performed.

Also, in the modified example, the interpolator 233 performs interpolation based on the parameter values of the parameters set by the user, but this is not limiting. In addition to the function of parts interpolation, the interpolator 233 may also perform parts extrapolation. For example, parts extrapolation is performed based on parameter values outside of the area surrounded by the nine black dots that denote parameter values set by the user as illustrated in FIG. 13B. Parts extrapolation is performed, for example, based on a θx parameter value of 100°, which is outside of −90° to 90° on θx, and a θy parameter value of 50°, which is outside of −45° to 45° on θy.

Also, by performing the aforementioned connection processing and interpolation processing on the multiple parts that constitute the two-dimensional model, multiple frames are generated such that one pose of the determined two-dimensional model is defined as frame one, another pose is defined as frame two, yet another pose is defined as frame three, and so on. When these frames are arranged on a time-axis, motion video can be created by playing the frames at, for example, 30 fps.

Also, the aforementioned embodiment and modified example presuppose that everything described is two-dimensional. Just in case, it is noted that the connection processing and the interpolation processing do not obstruct application in a three-dimensional space having depth.

Also, the aforementioned embodiment describes that the program for executing each operation (the acquirer 231, the connector 232, the interpolator 233, and the like) for each processing is pre-stored in the ROM 22. However, the program for realizing the functions of each unit may be stored and distributed on a non-transitory computer-readable recording medium such as a flexible disc, compact disc read-only memory (CD-ROM), digital versatile disc (DVD), magneto optical (MO) disc and/or the like. In addition, by installing the program on a computer such as a PC, a device that executes the above-described functions of each unit may be realized.

Furthermore, the program may be stored on a disk device and/or the like of a server device on the Internet, and for example, may be superimposed on carrier waves and may then be downloaded to a computer and/or the like.

The foregoing describes an embodiment and modified example for explanatory purposes. Although the foregoing discussion has presented a specific embodiment and modified example, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

(Supplemental Note 1)

An image processing device, including:

first memory means for storing, for each of a plurality of different display forms, first connection information regarding connection set between a display form of a first part and a connection medium that mediates connection of two-dimensional parts that are separated;

second memory means for storing, for each of a plurality of different display forms, second connection information regarding connection set between a display form of a second part and the connection medium;

first acquisition means for acquiring the first connection information set between the display form of the first part displayed on a display means and the connection medium, from the first memory means;

second acquisition means for acquiring the second connection information set between the display form of the second part displayed on the display means and the connection medium, from the second memory means; and connection means for connecting together the first part and the second part displayed on the display means based on the first connection information acquired by the first acquisition means and the second connection information acquired by the second acquisition means.

(Supplemental Note 2)

The image processing device according to Supplemental Note 1, wherein the first connection information contains first position information indicating a positional relationship between the first part and the connection medium, the second connection information contains second position information indicating a positional relationship between the second part and the connection medium, and the connection means adjusts a connection position of the first part and a connection position of the second part displayed on the display means based on the first position information and the second position information and connects together the first part and the second part.

(Supplemental Note 3)

The image processing device according to Supplemental Note 1 or 2, wherein the first connection information contains first mode information indicating a connection mode of the first part with respect to the connection medium, the second connection information contains second mode information indicating a connection mode of the second part with respect to the connection medium, and the connection means changes the first part displayed on the display means to be a connection mode indicating the first mode information, changes the second part displayed on the display means to be a connection mode indicating the second mode information, and connects together the first part and the second part that are changed.

(Supplemental Note 4)

The image processing device according to any one of Supplemental Notes 1 to 3, wherein the first connection information contains first weighting information indicating a degree of deformation in a connection portion of the first part, the second connection information contains second weighting information indicating a degree of deformation in a connection portion of the second part, and the connection means, after connection of the first part and the second part displayed on the display means, deforms the shape of the connection portion of the first part and the shape of the connection portion of the second part based on the first weighting information and the second weighting information.

(Supplemental Note 5)

The image processing device according to any one of Supplemental Notes 1 to 4, wherein the first connection information contains an influence level and an influence area indicating the extent to which a color of the first part influences a connection destination part, and the connection means, after connection of the first part and the second part displayed on the display means, blends the color of the first part with the color of the second part based on the influence level and the influence area.

(Supplemental Note 6)

The image processing device according to any one of Supplemental Notes 1 to 5, further including:

first part interpolation means for interpolating the first part indicating a display form that is between one display form and another display form based on a parameter value between a parameter value that determines the one display form and a parameter value that determines the another display form of the first part among the plurality of different display forms of the first part; and second part interpolation means for interpolating the second part indicating a display form that is between one display form and another display form based on a parameter value between a parameter value that determines the one display form and a parameter value that determines the another display form of the second part among the plurality of different display forms of the second part.

(Supplemental Note 7)

The image processing device according to Supplemental Note 6, further including:

first connection information interpolation means for interpolating the connection information between the display form of the first part interpolated by the first part interpolation means and the connection medium based on the first connection information set between the one display form of the first part and the connection medium and the first connection information set between the another display form of the first part and the connection medium; and second connection information interpolation means for interpolating the connection information between the display form of the second part interpolated by the second part interpolation means and the connection medium based on the second connection information set between the one display form of the second part and the connection medium and the second connection information set between the another display form of the second part and the connection medium.

(Supplemental Note 8)

The image processing device according to Supplemental Note 7, wherein the connection means connects together the first part interpolated by the first part interpolation means and the second part interpolated by the second part interpolation means based on the connection information interpolated by the first connection information interpolation means and the connection information interpolated by the second connection information interpolation means.

(Supplemental Note 9)

The image processing device according to any one of Supplemental Notes 1 to 8, further including:

display control means for displaying the first part and the second part connected together by the connection means on the display means.

(Supplemental Note 10)

An image processing method, including:

storing in a memory means, for each of a plurality of different display forms, first connection information regarding connection set between a display form of a first part and a connection medium that mediates connection of two-dimensional parts that are separated;

storing in the memory means, for each of a plurality of different display forms, second connection information regarding connection set between a display form of a second part and the connection medium;

acquiring the first connection information set between the display form of the first part displayed on a display means and the connection medium, from the memory means;

acquiring the second connection information set between the display form of the second part displayed on the display means and the connection medium, from the memory means; and connecting together the first part and the second part displayed on the display means based on the acquired first connection information and the acquired second connection information.

(Supplemental Note 11)

A program configured to cause a computer to function as:

first memory means for storing, for each of a plurality of different display forms, first connection information regarding connection set between a display form of a first part and a connection medium that mediates connection of two-dimensional parts that are separated;

second memory means for storing, for each of a plurality of different display forms, second connection information regarding connection set between a display form of a second part and the connection medium;

first acquisition means for acquiring the first connection information set between the display form of the first part displayed on a display means and the connection medium, from the first memory means;

second acquisition means for acquiring the second connection information set between the display form of the second part displayed on the display means and the connection medium, from the second memory means; and connection means for connecting together the first part and the second part displayed on the display means based on the first connection information acquired by the first acquisition means and the second connection information acquired by the second acquisition means.

This application claims the benefit of Japanese Patent Application No. 2013-249602, filed on Dec. 2, 2013, including the specification, claims, drawings, and abstract, the entire disclosure of which is incorporated herein by reference.

REFERENCE SIGNS LIST 100, 100' Image processing device
10 Inputter
21 CPU
22 ROM
23 RAM
24 HDD
25 I/O port
30 Display
210 Memory
211 Parts memory
212 Parts table
213 Display form table
214 Glue setting table
220 Setter
221 Parameter setter
222 Glue setter
230 Display controller
231 Acquirer
232 Connector
233 Interpolator

The invention claimed is:

1. An image processing device, comprising:
a first memory configured to store, for each of a plurality of different display forms of a first part, first connection information regarding connection set between a display form of the first part and a connection medium that mediates connection of two-dimensional parts that are separated;
a second memory configured to store, for each of a plurality of different display forms of a second part, second connection information regarding connection set between a display form of the second part and the connection medium;
a first acquirer configured to acquire the first connection information set between the display form of the first part displayed on a display and the connection medium, from the first memory;
a second acquirer configured to acquire the second connection information set between the display form of the second part displayed on the display and the connection medium, from the second memory; and
a connector configured to connect together the first part and the second part displayed on the display based on the first connection information acquired by the first acquirer and the second connection information acquired by the second acquirer,
wherein the two-dimensional parts include the first part and the second part.

2. The image processing device according to claim 1, wherein
the first connection information contains first position information indicating a positional relationship between the first part and the connection medium,
the second connection information contains second position information indicating a positional relationship between the second part and the connection medium, and
the connector is configured to adjust a connection position of the first part and a connection position of the second part displayed on the display based on the first position information and the second position information and connect together the first part and the second part.

3. The image processing device according to claim 1, wherein
the first connection information contains first mode information indicating a connection mode of the first part with respect to the connection medium,
the second connection information contains second mode information indicating a connection mode of the second part with respect to the connection medium, and
the connector is configured to change the first part displayed on the display to be a connection mode indicating the first mode information, change the second part displayed on the display to be a connection mode indicating the second mode information, and connect together the first part and the second part that are changed.

4. The image processing device according to claim 1, wherein
the first connection information contains first weighting information indicating a degree of deformation in a connection portion of the first part,
the second connection information contains second weighting information indicating a degree of deformation in a connection portion of the second part, and
the connector is configured to, after connection of the first part and the second part displayed on the display, deform the shape of the connection portion of the first part and the shape of the connection portion of the second part based on the first weighting information and the second weighting information.

5. The image processing device according to claim 1, wherein
the first connection information contains an influence level and an influence area indicating the extent to which a color of the first part influences a connection destination part, and
the connector is configured to, after connection of the first part and the second part displayed on the display, blend the color of the first part with the color of the second part based on the influence level and the influence area.

6. The image processing device according to claim 1, further comprising:
a first part interpolator configured to interpolate the first part indicating a display form that is between a first display form and a second display form based on a parameter value between a parameter value that determines the first display form and a parameter value that determines the second display form of the first part among the plurality of different display forms of the first part; and
a second part interpolator configured to interpolate the second part indicating a display form that is between a third display form and fourth display form based on a parameter value between a parameter value that determines the third display form and a parameter value that determines the fourth display form of the second part among the plurality of different display forms of the second part.

7. The image processing device according to claim 6, further comprising:
   a first connection information interpolator configured to interpolate the connection information between the display form of the first part interpolated by the first part interpolator and the connection medium based on the first connection information set between the first display form of the first part and the connection medium and the first information set between the second display form of the first part and the connection medium; and
   a second connection information interpolator configured to interpolate the connection information between the display form of the second part interpolated by the second part interpolator and the connection medium based on the second connection information set between the third display form of the second part and the connection medium and the second information set between the fourth display form of the second part and the connection medium.

8. The image processing device according to claim 7, wherein the connector is configured to, connect together the first part interpolated by the first part interpolator and the second part interpolated by the second part interpolator based on the connection information interpolated by the first connection information interpolator and the connection information interpolated by the second connection information interpolator.

9. The image processing device according to claim 1, further comprising:
   a display controller configured to display the first part and the second part connected together by the connector on the display.

10. An image processing method, comprising:
    storing in a memory, for each of a plurality of different display forms of a first part, first connection information regarding connection set between a display form of the first part and a connection medium that mediates connection of two-dimensional parts that are separated;
    storing in the memory, for each of a plurality of different display forms of a second part, second connection information regarding connection set between a display form of the second part and the connection medium;
    acquiring the first connection information set between the display form of the first part displayed on a display and the connection medium, from the memory;
    acquiring the second connection information set between the display form of the second part displayed on the display and the connection medium, from the memory; and
    connecting together the first part and the second part displayed on the display based on the acquired first connection information and the acquired second connection information,
    wherein the two-dimensional parts include the first part and the second part.

11. A non-transitory computer-readable recording medium storing a program configured to cause a computer to function as:
    a first memory configured to store, for each of a plurality of different display forms of a first part, first connection information regarding connection set between a display form of the first part and a connection medium that mediates connection of two-dimensional parts that are separated;
    a second memory configured to store, for each of a plurality of different display forms of a second part, second connection information regarding connection set between a display form of the second part and the connection medium;
    a first acquirer configured to acquire the first connection information set between the display form of the first part displayed on a display and the connection medium, from the first memory;
    a second acquirer configured to acquire the second connection information set between the display form of the second part displayed on the display and the connection medium, from the second memory; and
    a connector configured to connect together the first part and the second part displayed on the display based on the first connection information acquired by the first acquirer and the second connection information acquired by the second acquirer,
    wherein the two-dimensional parts include the first part and the second part.

* * * * *